United States Patent Office 3,377,356
Patented Apr. 9, 1968

3,377,356
CYCLOPROPANECARBOXYLIC ACID ESTERS
Kenzo Ueda, Nishinomiya-shi, Sadao Horie, Suita-shi, Toshio Mizutani, Ikeda-shi, Katsuji Nodera and Keimei Fujimoto, Minoo-shi, and Yositosi Okuno, Nishinomiya-shi, Japan, assignors to Sumitomo Chemical Company, Ltd., Osaka, Japan, a corporation of Japan
No Drawing. Filed July 6, 1965, Ser. No. 469,900
Claims priority, application Japan, July 8, 1964, 39/39,281; July 11, 1964, 39/39,851; July 15, 1964, 39/40,264, 39/40,265
17 Claims. (Cl. 260—326.3)

ABSTRACT OF THE DISCLOSURE

A cyclopropanecarboxylic acid ester consisting of chrysanthemum monocarboxylic acid as the acid moiety and an N-hydroxymethyl succinimide derivative as the alcohol moiety was prepared. The ester possesses significant insecticidal power but is harmless to warm-blooded animals.

This invention relates to novel cyclopropanecarboxylic acid esters. More particularly, it relates to novel cyclopropanecarboxylic acid esters having the general formula:

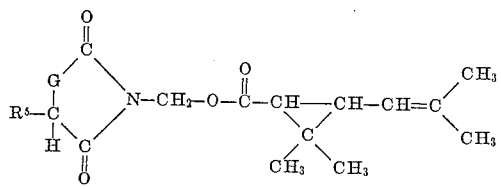

wherein G is a member selected from the group consisting of

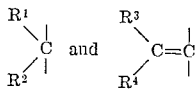

groups, wherein $R^1$ and $R^2$ each mean a member selected from the group consisting of hydrogen atom, and methyl radical, and $R^3$ and $R^4$ each mean a member selected from the group consisting of hydrogen atom, and methyl and phenyl radicals; and $R^5$ is a member selected from the group consisting of hydrogen atom, and methyl and ethyl radicals.

It is one object of the present invention to provide a novel group of cyclopropanecarboxylic acid esters, particularly of chrysanthemic acid esters, which have strong insecticidal activities to house and agricultural insects with low toxicities to warm-blooded animals and plants, and which can be commercially produced in low cost. Other objects will be obvious from the following description.

As an insecticide utilizable with safety because of the harmlessness to warm-blooded animals, pyrethrum extract has long been employed. Recently, allethrin which is an analogue of the effective ingredients in pyrethrum extract, i.e. pyrethrin and cinerin, was synthesized and developed for insecticidal uses. These ingredients are certainly valuable in their high insecticidal powers, especially in their rapid effect on insects, and in the characteristics of permitting no, or little, resistivity to insects. However, their uses are limited to some extent because of their complicated steps of the production and their great expense for the production.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low prices. In other words, the present compounds are succinimidomethyl and itaconimidomethyl esters of chrysanthemic acid. Accordingly, it is significant that the characteristics of the present compounds resemble pyrethrin, cinerin and allethrin, even though the alcohol moieties of the former are extremely simple as compared to those of the latter and are composed of carbon, hydrogen, oxygen, and nitrogen atoms, unlike the latter composed of carbon, hydrogen and oxygen.

Thus, the present invention is to provide novel cyclopropanecarboxylic acid esters having the formula,

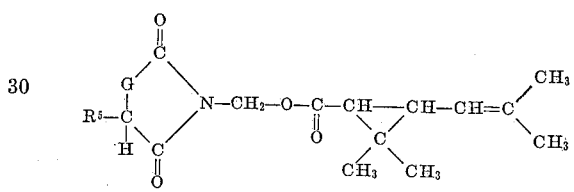

wherein G and $R^5$ have the same meanings as identified above, and to provide a process for preparing such compounds, comprising esterifying an imide compound having the general formula,

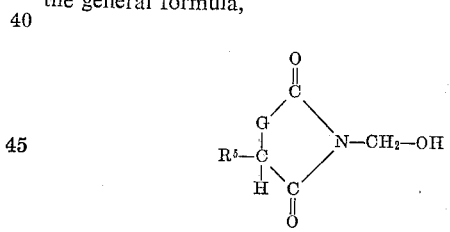

wherein G and $R^5$ have the same meanings as identified above, with a cyclopopanecarboxylic acid having the formula,

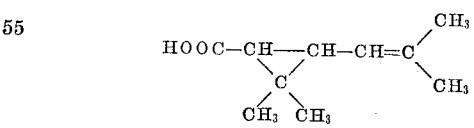

according to the general esterifying procedure.

The imide compounds employed in the present invention, in other words, N-methylol-succinimides and N-methylol-itaconimides, or N-(hydroxymethyl)-succinimides and N-(hydroxymethyl)-itaconimides, may be prepared from succinic acid, itaconic acid, their anhydrides, their imide compounds, or their substituted compounds, according to the procedures well-known to those skilled in the art. For instance, N-(hydroxymethyl)-succinimide may be prepared by reaction of succinimide with formaldehyde or its low molecular weight polymer according to the conventional methylolation conditions in the presence or absence of an alkaline catalyst, such as sodium hydroxide and potassium carbonate, in a solvent, such as water, benzene, and toluene. Similarly, various N-(hydroxymethyl) - succinimide and N-(hydroxymethyl)-itaconimide, such as N - (hydroxymethyl) - succinimide, N - (hydroxymethyl)-α-methylsuccinimide, N-(hydroxymethyl) - α - ethyl succinimide, N - (hydroxymethyl)-α,β-dimethyl - succinimide, N-(hydroxymethyl)-α,α-dimethyl-succinimide, N - (hydroxymethyl)-α-methyl-β-ethylsuccinimide, N - (hydroxymethyl) - itaconimide, N-(hydroxymethyl) - γ - methylitaconimide, N-(hydroxymethyl)-γ·γ-dimethylitaconimide, N-(hydroxymethyl)-γ-phenylitaconimide, N-(hydroxymethyl)-γ-methyl-γ-phenylitaconimide, N - (hydroxymethyl) - γ·γ - diphenylitaconimide, N-(hydroxymethyl)-α-methyl-γ·γ-dimethylitaconimide, N - (hydroxymethyl)-α-ethyl - γ·γ - dimethylitaconimide, and the like compounds may be prepared.

The cyclopropanecarboxylic acid employed in the present invention is chrysanthemic acid (chrysanthemum monocarboxylic acid). It is the acidic moieties of pyrethrin I, cinerin I and allethrin, and can be synthesized according to the known method.

The esterification reaction of the present invention may be effected in various ways. The imide compound may be heated with the cyclopropanecarboxylic acid in the presence of a strong acid, such as aromatic sulfonic acid and sulfuric acid, in an organic solvent capable of azeotropically boiling with water, thereby removing from the reaction system the water formed in the esterification. It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through the trans-esterification reaction out of the reaction system. In such a case, methyl, ethyl, n-propyl and isopropyl ester are suitable. In the most preferable esterification procedure, it may be treated with the cyclopropanecarboxylic acid halide in an inert organic solvent, preferably in the presence of a dehydrohalogenating agent, such as pyridine, triethylamine and other tertiary amine whereby the esterification proceeds with the isolation of a hydrohalic acid salt within a short period of time. In this case, the acid chloride is the most preferable, though the bromide and the iodide may be employed. Further, it may be refluxed with the cyclopropanecarboxylic acid anhydride in an inert solvent for several hours, thereby to yield the ester required and free cyclopropanecarboxylic acid, the latter being recovered and again converted to the anhydride by treatment with, for example, acetic anhydride for reuse. Alternatively, the imide compound may be employed for the esterification by once converted to the form of the halide having the general formula,

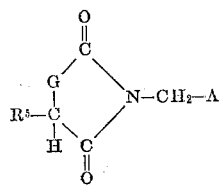

wherein G and $R^5$ have the same meanings as identified above, and A means a halogen atom. In this case, the halide may be heated with an alkali metal or ammonium salt of the cyclopropanecarboxylic acid in an inert solvent, thereby to yield the ester required with the isolation of an alkali metal or ammonium halide salt. Alternatively, the halide may be heated with the free acid in an inert solvent in the presence of a dehydrohalogenating agent, such as tertiary amines. In the formula, A may be any of chlorine, bromine, and iodine, among which the former two are preferable and more practicable. As the alkali metals, sodium and potassium are preferable.

As is well-known, the cyclopropanecarboxylic acid as identified above comprises various stereoisomers and optical isomers. It is needless to say that the acid and the derivatives thereof as described herein involve their isomers.

The process of the invention is described in more detail with reference to the following examples, which are however to be construed for the purpose of illustration and not of limitation. All parts are by weight.

EXAMPLES

Method A.—A method which employs acid chloride

Zero point one mol of an N-(hydroxymethyl)-succinimide or an N-(hydroxymethyl)-itaconimide was dissolved in a mixture of 0.15 mol of dry pyridine and 100 ml. of dry toluene. On the other hand, 0.102 mol of chrysanthemoyl chloride was dissolved in 50 ml. of dry toluene. When both solutions were mixed at a temperature of lower than 40° C., an exothermic reaction started, separating white crystals of pyridine hydrochloride. The reaction mixture was tightly closed with a stopper and allowed to stand overnight and then washed successively with 5 percent hydrochloric acid, saturated aqueous sodium bicarbonate solution and saturated aqueous sodium chloride solution and dried over anhydrous magnesium sulfate. The solution was filtered and the filtrate was purified by passing through an alumina column, freed from toluene at a reduced pressure and further freed from remaining toluene at highly reduced pressure (0.01 mm. Hg), thereby colorless or pale yellowish viscous oily or crystalline ester was obtained.

Method B.—A method which uses acid anhydride

Zero point one mol of an N-(hydroxymethyl)-succinimide or an N-(hydroxymethyl)-itaconimide was admixed with 0.1 mol of chrysanthemic acid anhydride and 100 ml. of dried toluene and stirred at a temperature of 90° to 100° C. for 3 hours. After cooling the mixture was treated with saturated sodium bicarbonate solution at a temperature lower than 10° C. to eliminate by-product, chrysanthemic acid and then washed with saturated aqueous solution of sodium chloride. The organic layer was dried over anhydrous magnesium sulfate and then treated in similar way as in the Method A to obtain ester.

Method C.—A method which uses acid

Zero point one mol of an N-(chloromethyl)-succinimide or an N-(chloromethyl)-itaconimide obtained by the reaction of an N-(hydroxymethyl)-succinimide or an N-(hydroxymethyl)-itaconimide with thionyl chloride or phosphorus trichloride at room temperature and 0.1 mol of chrysanthemic acid were dissolved in 200 ml. of dried acetone. While agitating the mixture, 0.11 mol of triethylamine was dropped therein and the mixture was refluxed for 2 hours. After completion of the reaction, the mixture was cooled and separated from crystals of triethylamine hydrochloride salt by filtration. Acetone was distilled off from the filtrate at a reduced pressure. The residue was dissolved in 100 ml. of toluene, washed successively with saturated aqueous solution of sodium bicarbonate and saturated aqueous solution of sodium chloride and dried over anhydrous magnesium sulfate. The product of ester was obtained by the similar treatment as in the Method A thereafter.

The examples conducted in accordance with the above-mentioned procedure are shown in the following Tables I and II.

TABLE I

| Example No. | N-(hydroxymethyl) succinimides used | Esterification method | Ester produced ||||| 
|---|---|---|---|---|---|---|---|
| | | | Formula | Yield (percent) | Refractive index | Elementary analysis (percent) |||
| | | | | | | C | H | N |
| 1 | H₂C—CO<br>    \N—CH₂OH<br>H₂C—CO | A | C₁₅H₂₁NO₄ | 87 | $n_D^{20}$ 1.4995 | Found...... 65.03<br>Calcd...... 64.52 | 7.81<br>7.53 | 4.87<br>5.01 |
| 2 | H₂C—CO<br>    \N—CH₂OH<br>HC—CO<br>  CH₃ | A | C₁₆H₂₃NO₄ | 86 | $n_D^{27}$ 1.4970 | Found...... 65.26<br>Calcd...... 65.53 | 8.04<br>7.85 | 4.69<br>4.78 |
| 3 | H₂C—CO<br>    \N—CH₂OH<br>HC—CO<br>  C₂H₅ | A | C₁₇H₂₅NO₄ | 87 | $n_D^{27}$ 1.4950 | Found...... 66.72<br>Calcd...... 66.45 | 8.53<br>8.14 | 4.21<br>4.56 |
| 4 | H₂C—CO<br>    \N—CH₂OH<br>H₂C—CO | B | C₁₅H₂₁NO₄ | 81 | $n_D^{28}$ 1.4997 | Found...... 64.98<br>Calcd...... 64.52 | 7.80<br>7.53 | 4.84<br>5.01 |
| 5 | CH₃<br>HC—CO<br>    \N—CH₂OH<br>HC—CO<br>CH₃ | A | C₁₇H₂₅NO₄ | 86 | $n_D^{27}$ 1.4913 | Found...... 66.61<br>Calcd...... 66.45 | 8.27<br>8.14 | 4.35<br>4.56 |
| 6 | CH₃<br>HC—CO<br>    \N—CH₂OH<br>HC—CO<br>CH₃<br>(Used after chlorination) | C | C₁₇H₂₅NO₄ | 84 | $n_D^{27}$ 1.4910 | Found...... 66.68<br>Calcd...... 66.45 | 8.30<br>8.14 | 4.37<br>4.56 |
| 7 | CH₃<br>  \C—CO<br>CH₃    \N—CH₂OH<br>H₂C—CO | A | C₁₇H₂₅NO₄ | 83 | $n_D^{27}$ 1.4920 | Found...... 66.71<br>Calcd...... 66.45 | 8.40<br>8.14 | 4.25<br>4.56 |
| 8 | CH₃<br>HC—CO<br>    \N—CH₂OH<br>HC—CO<br>C₂H₅<br>(Used after chlorination) | C | C₁₈H₂₇NO₄ | 83 | $n_D^{27}$ 1.4928 | Found...... 67.34<br>Calcd...... 67.29 | 8.70<br>8.41 | 4.05<br>4.36 |

TABLE II

| Example No. | N-(hydroxymethyl) itaconimide used | Esterification method | Ester produced |||||
|---|---|---|---|---|---|---|---|
| | | | Formula | Property | Yield (percent) | Elementary analysis (percent) |||
| | | | | | | C | H | N |
| 9 | H₂C=C—CO<br>     \N—CH₂OH<br>H₂C—CO | A | C₁₆H₂₁NO₄ | $n_D^{24}$ 1.5098 | 82 | Found...... 65.60<br>Calcd...... 65.98 | 7.52<br>7.22 | 5.03<br>4.81 |
| 10 | H₃C—CH=C—CO<br>        \N—CH₂OH<br>   H₂C—CO | A | C₁₇H₂₃NO₄ | $n_D^{25}$ 1.5090 | 79 | Found...... 67.10<br>Calcd...... 66.89 | 7.86<br>7.54 | 4.25<br>4.59 |
| 11 | CH₃    CO<br>  \C=C    \N—CH₂OH<br>CH₃  H₂C<br>       CO | A | C₁₈H₂₅NO₄ | M.P. 88°–90° C | 87 | Found...... 67.77<br>Calcd...... 67.71 | 7.93<br>7.84 | 4.28<br>4.39 |

TABLE II—Continued

| Example No. | N-(hydroxymethyl) itaconimide used | Esterification method | Ester produced ||||
|---|---|---|---|---|---|---|
| | | | Formula | Property | Yield (percent) | Elementary analysis (percent) C / H / N |
| 12 | H₃C\C=C/CO\N—CH₂OH with H₃C/ H₂C\CO (dimethyl itaconimide) | B | C₁₈H₂₅NO₄ | M.P. 87°–90° C | 81 | Found 67.83 / 7.99 / 4.22<br>Calcd 67.71 / 7.84 / 4.39 |
| 13 | H₃C\C=C/CO\N—CH₂OH with H₃C/ H₂C\CO (Used after chlorination) | C | C₁₈H₂₅NO₄ | M.P. 88°–90° C | 85 | Found 67.80 / 7.97 / 4.46<br>Calcd 67.71 / 7.84 / 4.39 |
| 14 | C₆H₅\C=C/CO\N—CH₂OH with C₆H₅/ H₂C\CO | A | C₂₅H₂₉NO₄ | $n_{D24}$ 1.5713 | 78 | Found 76.31 / 6.96 / 2.79<br>Calcd 75.85 / 6.55 / 3.16 |
| 15 | C₆H₅CH=C/CO\N—CH₂OH with H₂C\CO (Used after chlorination) | C | C₂₂H₂₅NO₄ | M.P. 153°–155° C | 86 | Found 72.09 / 7.03 / 3.91<br>Calcd 71.93 / 6.81 / 3.81 |
| 16 | C₆H₅\C=C/CO\N—CH₂OH with CH₃/ H₂C\CO | A | C₂₃H₂₇NO₄ | $n_{D23}$ 1.5386 | 80 | Found 72.91 / 7.35 / 3.25<br>Calcd 72.44 / 7.09 / 3.67 |
| 17 | H₃C\C=C/CO\N—CH₂OH with H₃C/ HC\CO and CH₃ | A | C₁₉H₂₇NO₄ | $n_{D25}$ 1.5115 | 75 | Found 68.34 / 8.64 / 3.88<br>Calcd 68.47 / 8.11 / 4.20 |
| 18 | H₃C\C=C/CO\N—CH₂OH with H₃C/ HC\CO and H₅C₂ | A | C₂₀H₂₉NO₄ | $n_{D27}$ 1.5093 | 80 | Found 69.36 / 8.51 / 3.87<br>Calcd 69.16 / 8.36 / 4.03 |

As mentioned above, the present esters possess superior insecticidal power, and exhibit rapid knock down and excellent killing effect on e.g. house flies, mosquitoes, cockroaches. Moreover, these esters are especially useful for sanitary and domestic purposes, because of their rapid effectiveness and harmlessness. The present esters are suitably employed for the preparation of insecticidal compositions which have broad uses, correlatively with the low cost.

For the formulation of the insecticidal composition containing the present compound as the essential ingredient, oil solution, emulsifiable concentrate, wettable powder, dust, aerosol, mosquito coil (a burning incense device for warding off mosquitoes), bait and other preparation, may be formulated using generally employed carriers, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnaphthalene, depending upon the type of the formulation.

If desired, the present esters may be employed for the preparation of the insecticidal compositions in combination with another insecticidal component, such as pyrethroide, for example, pyrethrum extract and allethrin, organochlorine and organophosphorus compounds, synergistic agent for pyrethroide, for example, piperonyl butoxide, piperonyl sulfoxide, β-butoxy-β'-thiocyanodiethyl ether and the like. By combination with such other ingredient, the present insecticidal composition can be adapted to broader uses with increased effect.

The present esters may be blended with at least one of pyrethrin, allethrin, O,O-dimethyl-O-(3-methyl-4-nitrophenyl) thiophosphate, "Malathion"—trademark, diazinone, dimethoate, γ-BHC, and others, to yield a pesticidal composition which possesses high insecticidal activity with rapid effectivity. In such cases, the two components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula

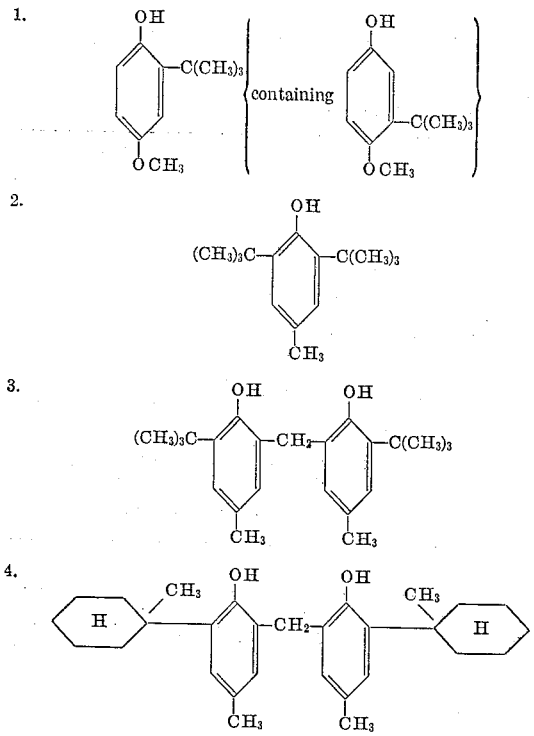

The amount of the stabilizer, if added, may be less than 1% by weight of the present ester, ordinarily from 1 to 0.1%.

The following are examples of insecticidal compositions containing the cyclopropanecarboxylic acid esters according to the invention and of the insecticidal activities. Parts are by weight.

EXAMPLE 19

Two parts of N-(chrysanthemoxymethyl)-succinimide were dissolved in 15 parts of xylene and refined kerosene was added to the resulting mixture to make the volume, 100 ml., whereby 2 percent by weight of oil preparation was obtained.

With use of a Campbell's Turn-table (Campbell, F. L., Sullivan, W. N., Soap and Sanit, Chemicals vol. 14, No. 6, P-119, 1938) each 5 ml. of the above-mentioned oil preparation and solutions diluted with a refined kerosene 2 times and 4 times were sprayed within 10 seconds. After 20 seconds the shutter was opened and house flies (adult, one group of about 100 flies) were exposed to the sprayed mist for 10 minutes. Then the house flies were transferred to an observation cage and the knock down number was counted. After 24 hours, kill number was also observed. The result is shown as follows:

| Concentration of the active ingredient (percent) | Knock down ratio after 10 minutes (percent) | Mortality after 24 hours (percent) |
|---|---|---|
| 2.0 | 100 | 87.6 |
| 1.0 | 100 | 56.3 |
| 0.5 | 100 | 23.9 |

EXAMPLE 20

Ten parts of N-(chrysanthemoxymethyl)-α-methylsuccinimide, 80 parts of xylene and 10 parts of Sorpol SM-200 (trade name of a surfactant of Toho Chemical Co., Ltd.) were admixed in this order and dissolved with stirring to obtain an emulsifiable concentrate.

House flies (adult, a group of about 50 flies) were liberated in a high Petri dish and after covered with a metal net lid, the Petri dish was charged to the bottom of a settling-tower (McCallan, S. E. A., Contributions of Boyce Thompson, Inst. vol. 12, P-451, 1942). Ten mls. of the solution obtained by diluting the above-mentioned emulsifiable concentrate 20 times with water was sprayed upward at a pressure of 20 lbs. per sq. in. After 20 seconds, the shutter was opened, the house flies were exposed to the descending mist for 10 minutes, taken out and placed in a room kept at a temperature of 27° C. The mortality was 85.3 percent after 20 hours.

EXAMPLE 21

One point five grams of N-(chrysanthemoxymethyl)-α-ethylsuccinimide was dissolved in 30 mls. of acetone and admixed with 98.5 g. of mosquito coil carrier (a blend of tabu powder and pyrethrum marc in 2:3 proportion by weight) homogeneously with stirring. After evaporating acetone, 100 mls. of water was added to the above-mentioned mixture. Resulting mass was sufficiently kneaded, moulded into a coil and dried, whereby a mosquito coil containing 1.5 percent by weight of active ingredient was obtained.

About 30 northern house mosquitoes were liberated in a glass box of 70 cm. cube and 1 g. piece of the above-mentioned mosquito coil was hold horizontally on a mosquito coil holder placed on the central part of the bottom of the box. Both ends of the coil were ignited and knock down number of northern house mosquitoes was observed relative to elapsed time. The result is shown as follows:

| | Knock down ratio of northern house mosquitoes relative to elapse of time (percent) | | | | |
|---|---|---|---|---|---|
| | 3 min. | 6 min. | 12 min. | 24 min. | 48 min. |
| The Present 1.5% mosquito coil | 9.0 | 22.0 | 42.6 | 59.4 | 81.3 |

EXAMPLE 22

Zero point five part of N-(chrysanthemoxymethyl)-α,β-dimethylsuccinimide was dissolved in refined kerosene so as to make the volume 100 mls., whereby 0.5 percent by weight of oil preparation was obtained.

About 30 house flies (adult) were liberated in a 70 cm.³ glass box, 0.3 ml. of the above-mentioned oil preparation was uniformly atomized in the space of the box and knock down number of house flies was observed relative to elapsed time. The result is shown as follows:

| | Knock down ratio of house flies relative to elapse of time (percent) | | | | | |
|---|---|---|---|---|---|---|
| | 30 sec. | 1 min. | 2 min. | 4 min. | 8 min. | 11 min. 20 sec. |
| The present 0.5% oil preparation | 2.6 | 7.8 | 36.5 | 59.9 | 80.5 | 87.4 |
| Allethrin 0.3% oil preparation | 1.7 | 11.1 | 23.6 | 58.9 | 77.7 | 86.7 |

EXAMPLE 23

Two parts of N-(chrysanthemoxymethyl)-α,α-dimethylsuccinimide was dissolved in 20 parts of acetone, 98 parts of 200 mesh talc powder were added thereto. After sufficiently stirred and mixed with a mortar, and the acetone was evaporated from the mixture to leave 1.5% dust preparation.

House flies (adult, a group of about 50 flies) were liberated in a high Petri dish, closed with a metal wire-net lid and introduced into the bottom of a settling tower. One gram of the above-mentioned dust was scattered upward at a pressure of 20 lbs./in.². The shutter was opened after 10 seconds and the house flies were exposed to the descending dust for 10 minutes. After taken out, the house flies were placed in a room kept at 27° C. Mortality after 20 hours amounted to 91.5 percent.

EXAMPLE 24

One part of N-(chrysanthemoxymethyl)-α-methyl-β-ethylsuccinimide was dissolved in 5 parts of xylene and diluted with refined kerosene to make the volume 100 mls., whereby one percent oil preparation was obtained.

House flies (adult, a group of about 50 flies) were liberated in a high Petri dish, closed with a metal wire-net lid and introduced into the bottom of a settling tower. Ten mls. of the above-mentioned oil preparation was sprayed upward at a pressure of 20 lbs./in.$^2$ The shutter was opened after 20 seconds and the house flies were exposed to the descending mist for 10 minutes. After taken out, the house flies were placed in a room kept at 27° C. Mortality after 20 hours amounted to 95.9 percent.

Example 25

In similar way as in Example 19, a 100 mls. refined kerosene solution containing 2 parts of N-(chrysanthemoxymethyl)-itaconimide and 10 parts of xylene was prepared and tested.

The result is shown as follows:

| Concentration of the active ingredient (percent) | Knock down ratio after 10 minutes (percent) | Mortality after 24 hours (percent) |
|---|---|---|
| 2.0 | 100 | 91.3 |
| 1.0 | 100 | 49.1 |
| 0.5 | 100 | 15.7 |

Example 26

In similar way as in Example 20, an emulsifiable concentrate containing 10 parts of N-(chrysanthemoxymethyl)-γ-methylitaconimide, 10 parts of Sorpol SM-200 and 80 parts of xylene was prepared and tested by using 10 mls. of the solution obtained by diluting the above-mentioned emulsifiable concentrate 10 times with water. The mortality was 87.0 percent after 20 hours.

Example 27

In similar way as in Example 22, 100 mls. refined kerosene solution containing 0.3 part of N-(chrysanthemoxymethyl)-γ·γ-dimethylitaconimide and 1 part of xylene was prepared and tested.

The result is shown as follows:

| | Knock down ratio of house flies, relative to lapse of time (percent) | | | | | |
|---|---|---|---|---|---|---|
| | 30 sec. | 1 min. | 2 min. | 4 min. | 8 min. | 11 min. 20 sec. |
| The present 0.3% oil preparation | 0 | 9.8 | 40.0 | 60.9 | 80.2 | 87.3 |
| Allethrin 0.3% oil preparation | 1.6 | 10.6 | 21.0 | 51.6 | 77.5 | 83.9 |

Example 28

In similar way as in Example 23, 3 percent by weight dust preparation containing N-(chrysanthemoxymethyl)-γ-methyl-γ-phenylitaconimide was prepared and tested. Mortality was 98.5 percent after 20 hours.

Example 29

In similar way as in Example 24, a 100 mls. refined kerosene solution containing 2 parts of N-(chrysanthemoxymethyl)-γ·γ-diphenylitaconimide and 10 parts of xylene was prepared and tested. Mortality was 97.8% after 20 hours.

Example 30

In similar way as in Example 23, 3 percent by weight dust preparation containing N-(chrysanthemoxymethyl)-γ-phenylitaconimide was prepared and tested. Mortality was 94.5% after 20 hours.

Example 31

In similar way as in Example 21, 1.5 percent by weight mosquito coil containing N-(chrysanthemoxymethyl)-α-methyl-γ·γ-dimethylitaconimide was prepared and tested The result was as follows:

| | Knock down ratio of northern house mosquitoes relative to the elapse of time (percent) | | | | |
|---|---|---|---|---|---|
| | 3 min. | 6 min. | 12 min. | 24 min. | 48 min. |
| The present 1.5% mosquito coil | 0 | 14.0 | 33.7 | 66.9 | 86.5 |

Example 32

In similar way as in Example 32, a 100 mls. refined kerosene solution containing 0.5 part of N-(chrysanthemoxymethyl) - α - ethyl-γ·γ-dimethylitaconimide was prepared and tested against northern house mosquitoes. The result was as follows:

| | Knock down percentage of northern house mosquitoes, relative to elapse of time (percent) | | | | | |
|---|---|---|---|---|---|---|
| | 30 sec. | 1 min. | 2 min. | 4 min. | 8 min. | 11 min. 20 sec. |
| The Composition of the present invention | 2.1 | 18.0 | 39.1 | 56.3 | 71.8 | 82.7 |

What we claim is:

1. A cyclopropanecarboxylic acid ester having the formula,

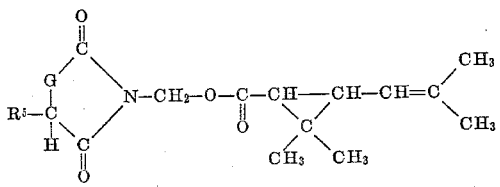

wherein G is a group of the formula,

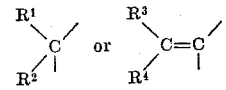

wherein $R^1$ and $R^2$ each is hydrogen or methyl, $R^3$ and $R^4$ is each hydrogen, methyl or phenyl, and $R^5$ is hydrogen, methyl or ethyl.

2. An ester according to claim 1, wherein G is

3. An ester according to claim 1, where G is

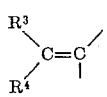

4. An ester according to claim 2, wherein $R^1$ is hydrogen, $R^2$ is hydrogen, and $R^5$ is hydrogen.

5. An ester according to claim 2, wherein $R^1$ is hydrogen, $R^2$ is hydrogen, and $R^5$ is methyl.

6. An ester according to claim 2, wherein $R^1$ is hydrogen, $R^2$ is hydrogen, and $R^5$ is ethyl.

7. An ester according to claim 2, wherein $R^1$ is methyl, $R^2$ is hydrogen, and $R^5$ is methyl.

8. An ester according to claim 2, wherein $R^1$ is methyl, $R^2$ is methyl, and $R^5$ is hydrogen.

9. An ester according to claim 2, wherein $R^1$ is methyl, $R^2$ is hydrogen, and $R^5$ is ethyl.

10. An ester according to claim 3, wherein $R^3$ is hydrogen, $R^4$ is hydrogen, and $R^5$ is hydrogen.

11. An ester according to claim 3, wherein $R^3$ is hydrogen, $R^4$ is methyl, and $R^5$ is hydrogen.

12. An ester according to claim 3, wherein $R^3$ is methyl, $R^4$ is methyl, and $R^5$ is hydrogen.

13. An ester according to claim 3, wherein $R^3$ is phenyl, $R^4$ is phenyl, and $R^5$ is hydrogen.

14. An ester according to claim 3, wherein $R^3$ is phenyl, $R^4$ is hydrogen, and $R^5$ is hydrogen.

15. An ester according to claim 3, wherein $R^3$ is phenyl, $R^4$ is methyl, and $R^5$ is hydrogen.

16. An ester according to claim 3, wherein $R^3$ is methyl, $R^4$ is methyl, and $R^5$ is methyl.

17. An ester according to claim 3, wherein $R^3$ is methyl, $R^4$ is methyl, and $R^5$ is ethyl.

References Cited

UNITED STATES PATENTS

| 1,915,334 | 6/1933 | Salzberg et al. | 260—243 |
| 2,075,359 | 3/1937 | Salzberg et al. | 167—22 |
| 3,318,766 | 5/1967 | Kato et al. | 167—33 |

NICHOLAS S. RIZZO, *Primary Examiner.*

ALEX MAZEL, *Examiner.*

JOSE TOVAR, *Assistant Examiner.*